(12) United States Patent
Shimamoto et al.

(10) Patent No.: US 11,995,367 B1
(45) Date of Patent: May 28, 2024

(54) IMAGE FORMING APPARATUS AND IMAGE FORMING METHOD CAPABLE OF PRESENTING AND CHANGING INTERNAL PRIORITY OF PRINTING ORDER

(71) Applicant: KYOCERA Document Solutions Inc., Osaka (JP)

(72) Inventors: Kunihiko Shimamoto, Torrance, CA (US); Taku Matsuo, Los Angeles, CA (US); Norifumi Miyahara, Torrance, CA (US); Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/097,470

(22) Filed: Jan. 16, 2023

(51) Int. Cl.
*G06F 3/12* (2006.01)
(52) U.S. Cl.
CPC .................... *G06F 3/1296* (2013.01)
(58) Field of Classification Search
CPC ...... G06F 21/00; G06F 21/608; G06F 3/1204; G06F 3/1222; G06F 3/1238; G06F 3/1263; G06F 3/1267; G06F 3/1288
USPC ......................................................... 358/1.15
See application file for complete search history.

(56) References Cited

U.S. PATENT DOCUMENTS

| | | | | |
|---|---|---|---|---|
| 6,633,395 B1* | 10/2003 | Tuchitoi | ............. | G06K 15/1803 358/1.14 |
| 7,911,630 B2* | 3/2011 | Matsueda | .......... | G06K 15/1818 358/1.14 |
| 9,235,786 B2* | 1/2016 | Wakana | ................. | G06K 15/16 |
| 2006/0203256 A1* | 9/2006 | Hagiwara | ............. | G06F 3/1205 358/1.16 |
| 2009/0046319 A1* | 2/2009 | Fukusada | .............. | G06F 3/1263 358/1.15 |
| 2010/0163422 A1* | 7/2010 | Hsiao | ..................... | C25D 7/001 204/192.15 |
| 2012/0206763 A1* | 8/2012 | Yoshida | ................ | G06F 3/1263 358/1.15 |
| 2012/0236351 A1* | 9/2012 | Arima | ................ | G06K 15/1809 358/1.15 |
| 2014/0355031 A1* | 12/2014 | Fukuda | .............. | G06K 15/4065 358/1.14 |

(Continued)

FOREIGN PATENT DOCUMENTS

JP 2010-023367 A 2/2010

*Primary Examiner* — Negussie Worku
(74) *Attorney, Agent, or Firm* — Hawaii Patent Services; Nathaniel K. Fedde; Kenton N. Fedde

(57) ABSTRACT

Provided is an image forming apparatus capable of appropriately setting and adjusting the order of printing jobs by presenting an internal priority. An instruction acquiring unit presents a job list in which the plurality of jobs is arranged in the printing order and acquires a change instruction of the printing order. The instruction acquiring unit also presents the internal priority to the job list and acquires a change instruction to change the internal priority. An internal priority setting unit sets, based on the change instruction, an internal priority that is different from set priority specified for each of the plurality of jobs. The internal priority setting unit changes the internal priority according to the change instruction to change the internal priority. An image forming unit that outputs each of the plurality of jobs in the printing order corresponding to the internal priority.

18 Claims, 16 Drawing Sheets

(56) References Cited

U.S. PATENT DOCUMENTS

2016/0011821 A1* 1/2016 Tomihisa .............. G06F 3/1286
358/1.13

* cited by examiner

FIG. 4

| PRINTING ORDER | STATUS | JOB NAME | SET PRIORITY |
|---|---|---|---|
| 1 | Running | Mid 1 | 50 |
| 2 | Waiting | Mid 2 | 50 |
| 3 | Waiting | Mid 3 | 50 |

| PRINTING ORDER | STATUS | JOB NAME | SET PRIORITY |
|---|---|---|---|
| 1 | Running | Mid 1 | 50 |
| 2 | Waiting | High 1 | 70 |
| 3 | Waiting | Mid 2 | 50 |
| 4 | Waiting | Mid 3 | 50 |

| PRINTING ORDER | STATUS | JOB NAME | SET PRIORITY |
|---|---|---|---|
| 1 | Running | Mid 1 | 50 |
| 2 | Waiting | Mid 2 | 50 |
| 3 | Waiting | High 1 | 70 |
| 4 | Waiting | Mid 3 | 50 |

| PRINTING ORDER | STATUS | JOB NAME | SET PRIORITY | INTERNAL PRIORITY |
|---|---|---|---|---|
| 1 | Running | Mid 1 | 50 | 50 |
| 2 | Waiting | Mid 2 | 50 | 70 |
| 3 | Waiting | High 1 | 70 | 70 |
| 4 | Waiting | Mid 3 | 50 | 50 |

| PRINTING ORDER | STATUS | JOB NAME | SET PRIORITY |
|---|---|---|---|
| 1 | Running | Mid 1 | 50 |
| 2 | Waiting | Mid 2 | 50 |
| 3 | Waiting | High 1 | 70 |
| 4 | Waiting | High 2 | 70 |
| 5 | Waiting | Mid 3 | 50 |

FIG. 9

| PRINTING ORDER | STATUS | JOB NAME | SET PRIORITY |
|---|---|---|---|
| 1 | Running | Mid 1 | 50 |
| 2 | Waiting | Mid 2 | 50 |
| 3 | Waiting | High 1 | 70 |
| 4 | Waiting | Mid 3 | 50 |

| PRINTING ORDER | STATUS | JOB NAME | SET PRIORITY | INTERNAL PRIORITY |
|---|---|---|---|---|
| 1 | Running | Mid 1 | 50 | 50 |
| 2 | Waiting | Mid 2 | 50 | 50 |
| 3 | Waiting | High 1 | 70 | 50 |
| 4 | Waiting | Mid 3 | 50 | 50 |

FIG. 11

| PRINTING ORDER | STATUS | JOB NAME | SET PRIORITY |
|---|---|---|---|
| 1 | Running | Mid 1 | 50 |
| 2 | Waiting | High 2 | 70 |
| 3 | Waiting | Mid 2 | 50 |
| 4 | Waiting | High 1 | 70 |
| 5 | Waiting | Mid 3 | 50 |

| PRINTING ORDER | STATUS | JOB NAME | SET PRIORITY |
|---|---|---|---|
| 1 | Running | Mid 3 | 50 |
| 2 | Waiting | Mid 1 | 255 |
| 3 | Waiting | High 1 | 70 |
| 4 | Waiting | Mid 2 | 50 |

| PRINTING ORDER | STATUS | JOB NAME | SET PRIORITY | INTERNAL PRIORITY |
|---|---|---|---|---|
| 1 | Running | Group1-Mid1 | 50 | 50 |
| 2 | Waiting | Group1-Hight1 | 70 | 70 |
| 3 | Waiting | Group1-Hight2 | 70 | 70 |
| 4 | Waiting | Group2-Hight1 | 70 | 70 |
| 5 | Waiting | Group2-Mid1 | 50 | 50 |
| 6 | Waiting | Group1-Mid1 | 50 | 50 |
| 7 | Waiting | Group2-Mid2 | 50 | 50 |
| 8 | Waiting | Group1-Mid2 | 50 | 50 |

| PRINTING ORDER | STATUS | JOB NAME | SET PRIORITY | INTERNAL PRIORITY |
|---|---|---|---|---|
| 1 | Running | Group1-Mid1 | 50 | 50 |
| 2 | Waiting | Group1-Hight2 | 70 | 70 |
| 3 | Waiting | Group1-Hight1 | 70 | 70 |
| 4 | Waiting | Group2-Hight1 | 70 | 70 |
| 5 | Waiting | Group2-Mid1 | 50 | 50 |
| 6 | Waiting | Group1-Mid1 | 50 | 50 |
| 7 | Waiting | Group2-Mid2 | 50 | 50 |
| 8 | Waiting | Group1-Mid2 | 50 | 50 |

| PRINTING ORDER | STATUS | JOB NAME | SET PRIORITY | INTERNAL PRIORITY |
|---|---|---|---|---|
| 1 | Running | Group1-Mid1 | 50 | 50 |
| 2 | Waiting | Group1-Hight1 | 70 | 70 |
| 3 | Waiting | Group1-Hight2 | 70 | 70 |
| 4 | Waiting | Group2-Hight1 | 70 | 70 |
| 5 | Waiting | Group2-Mid1 | 50 | 50 |
| 6 | Waiting | Group1-Mid2 | 50 | 50 |
| 7 | Waiting | Group1-Mid1 | 50 | 50 |
| 8 | Waiting | Group2-Mid2 | 50 | 50 |

IMAGE FORMING APPARATUS AND IMAGE FORMING METHOD CAPABLE OF PRESENTING AND CHANGING INTERNAL PRIORITY OF PRINTING ORDER

BACKGROUND

The present disclosure relates to an image forming apparatus, an image forming system, and an image forming method capable of changing the order of printing order a plurality of jobs.

There are image forming apparatuses such as multifunctional peripherals (MFPs) capable of printing documents and images. As a typical image forming apparatus, there is described an image forming apparatus that puts a job in a waiting state, receives an operation input through an operation display unit, and displays a priority order change screen on the operation display unit. This apparatus functions as a priority change unit that changes the priority of a waiting job on the displayed priority change screen. Then, new execution of a job is prohibited while the priority change screen is being displayed. Then, after the display of the priority order change screen is completed, the job in the waiting state is executed by the printing unit according to the priority order to print the image.

SUMMARY

An image forming apparatus according to the present disclosure is an image forming apparatus capable of changing printing order of a plurality of jobs, including: an instruction acquiring unit that present a job list in which the plurality of jobs is arranged in the printing order and acquire a change instruction of the printing order; an internal priority setting unit that sets, based on the change instruction acquired by the instruction acquiring unit, an internal priority that is different from set priority specified for each of the plurality of jobs; and an image forming unit that outputs each of the plurality of jobs in the printing order corresponding to the internal priority set by the internal priority setting unit; wherein: the instruction acquiring unit also presents the internal priority to the job list and acquires a change instruction to change the internal priority; and the internal priority setting unit changes the internal priority according to the change instruction to change the internal priority.

An image forming system according to the present disclosure is an image forming system capable of changing printing order of a plurality of jobs, including: an instruction acquiring unit that present a job list in which the plurality of jobs is arranged in the printing order and acquire a change instruction of the printing order; an internal priority setting unit that sets, based on the change instruction acquired by the instruction acquiring unit, an internal priority that is different from set priority specified for each of the plurality of jobs; and an image forming unit that outputs each of the plurality of jobs in the printing order corresponding to the internal priority set by the internal priority setting unit; wherein: the instruction acquiring unit also presents the internal priority to the job list and acquires a change instruction to change the internal priority; and the internal priority setting unit changes the internal priority according to the change instruction to change the internal priority.

An image forming method according to the present disclosure is an image forming method executed by an image forming apparatus capable of changing printing order of a plurality of jobs, including the steps of: presenting a job list in which the plurality of jobs is arranged in the printing order and acquiring a change instruction of the printing order; presenting an internal priority that is different from set priority specified for each of the plurality of jobs to the job list and acquires a change instruction to change the internal priority; setting, based on the acquired change instruction, the internal priority; changing the internal priority according to the change instruction to change the internal priority; and outputting each of the plurality of jobs in the printing order corresponding to the set internal priority.

BRIEF DESCRIPTION OF THE DRAWINGS

FIG. 4 is a conceptual diagram of the job list in the instruction acquisition process as shown in FIG. 3;

FIG. 5 is a conceptual diagram of the job list when a new job is added in the instruction acquisition process as shown in FIG. 3;

FIG. 6 is a conceptual diagram of the job list in the upper priority process as shown in FIG. 3;

FIG. 7 is a conceptual diagram of internal priorities in the job list in the upper priority process as shown in FIG. 3;

FIG. 8 is a conceptual diagram of the job list when a new job is added after the upper priority processing as shown in FIG. 3;

FIG. 9 is a conceptual diagram of the job list in the lower priority process as shown in FIG. 3;

FIG. 10 is a conceptual diagram of internal priority in the job list in the lower priority process as shown in FIG. 3;

FIG. 11 is a conceptual diagram of the job list when a new job is added after the lower priority processing as shown in FIG. 3;

FIG. 12 is a conceptual diagram of the job list of the interrupt printing process as shown in FIG. 3;

FIG. 13 is a conceptual diagram of a job list of the unpresented position selection process as shown in FIG. 3;

FIG. 14 is a conceptual diagram of a job list when a job is moved above an unpresented job in the unpresented position selection process as shown in FIG. 3;

FIG. 15 is a conceptual diagram of the job list when the job is moved under the unpresented job in the unpresented position selection process as shown in FIG. 3.

DETAILED DESCRIPTION

Embodiment

[System Configuration of Image Forming Apparatus 1]

Figure 1:
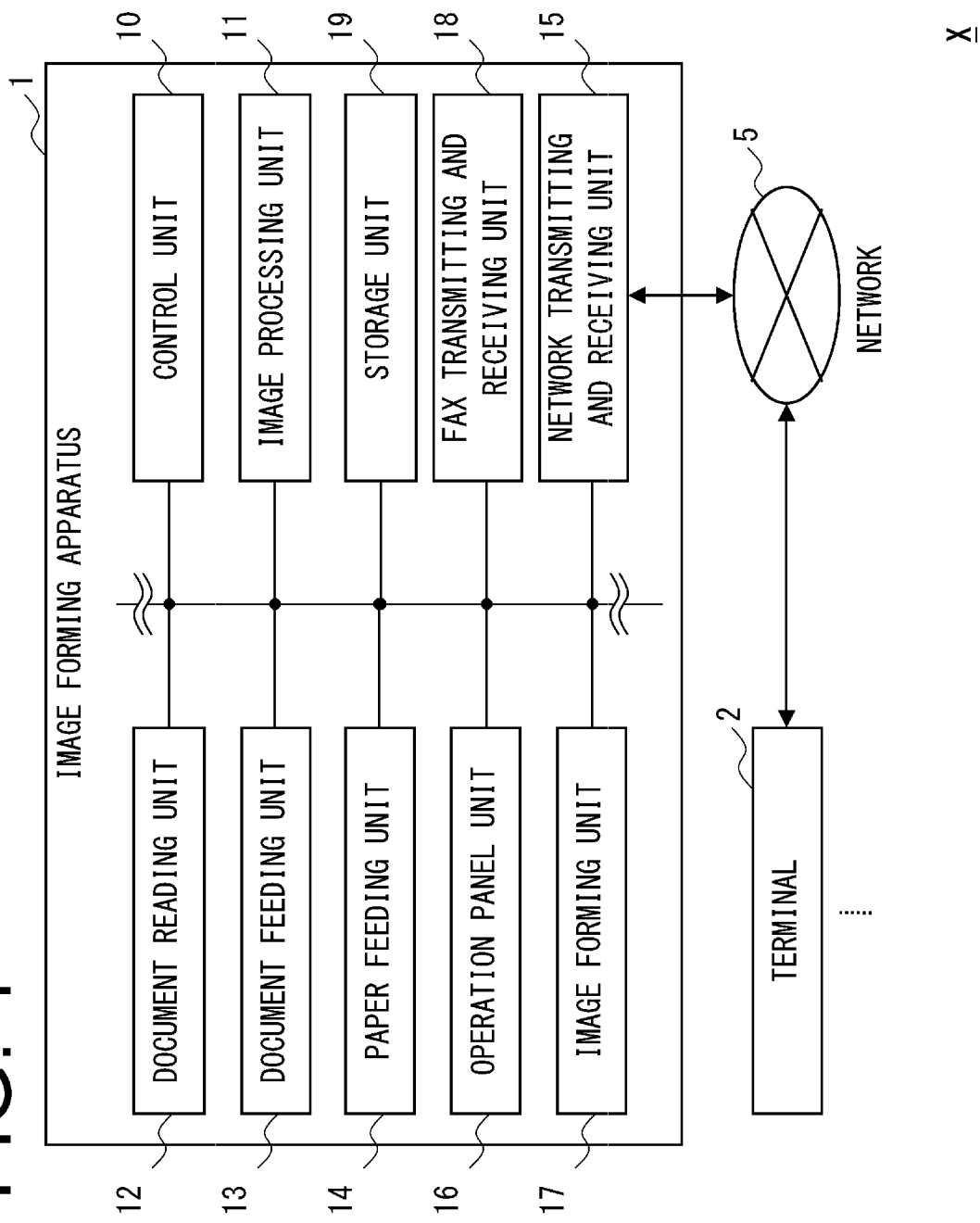
FIG. 1 is a system configuration figure of an image forming apparatus according to an embodiment according to the present disclosure.

Firstly, referring to FIG. 1, the system configuration of an image forming system X including an image forming apparatus 1 is described.

The image forming apparatus 1 includes an image processing unit 11, a document reading unit 12, a document feeding unit 13, a paper feeding unit 14, a network transmitting and receiving unit 15, an operation panel unit 16, an image forming unit 17, a FAX transmitting and receiving unit 18, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, an application-specific processor), and the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from an external terminal or the operation panel unit 16.

The image processing unit 11 is a control calculation unit such as a DSP (Digital Signal Processor), a GPU (Graphics Processing Unit), and the like. The image processing unit 11 performs image processing on image data. For example, the image processing may be processing such as enlargement/reduction, density adjustment, gradation adjustment, image improvement, and the like.

The image processing unit 11 also stores the image read by the document reading unit 12 in the storage unit 19 as print data. At this time, the image processing unit 11 can also convert the print data into an electronic document such as PDF and the like, or an image data file such as TIFF and the like. Further, the image processing unit 11 may be capable of executing at least part of OCR (Optical Character Recognition) processing.

The document reading unit 12 reads the set document. Further, the document reading unit 12 is arranged on the upper portion of the main body unit of the image forming apparatus 1.

The document reading unit 12 includes a scanner, a platen glass, and a document reading slit. When reading a document placed on the platen glass, the document reading unit 12 moves the scanner to a position facing the platen glass, reads the document placed on the platen glass while scanning, acquires image data, and stores the acquired image data in the storage unit 19.

Further, when reading a document fed from the document feeding unit 13, the document reading unit 12 moves the scanner to a position facing the document reading slit. Then, the document reading unit 12 reads the document through the document reading slit in synchronization with the document feeding operation of the document feeding unit 13 to acquire image data. The document reading unit 12 stores the acquired image data in the storage unit 19.

The document feeding unit 13 conveys the document read by the document reading unit 12. The document feeding unit 13 is arranged above the document reading unit 12.

The document feeding unit 13 includes a document placing unit and a document conveying mechanism. The document feeding unit 13 feeds the documents placed on the document placing unit one by one by the document conveying mechanism and feeds them to the document reading unit 12.

The paper feeding unit 14 feeds recording papers one by one toward the image forming unit 17. The paper feeding unit 14 is provided within the main body.

The network transmitting and receiving unit 15 is a network connection unit for connecting to the network 5, which includes as a LAN board, a wireless transmitting and receiving apparatus, and the like. The network 5 according to the present embodiment is, for example, a LAN (Local Area Network), a wireless LAN (Wi-Fi), a mobile phone network, the other type of WAN (Wide Area Network), a voice telephone network, or the like.

Figure 2:
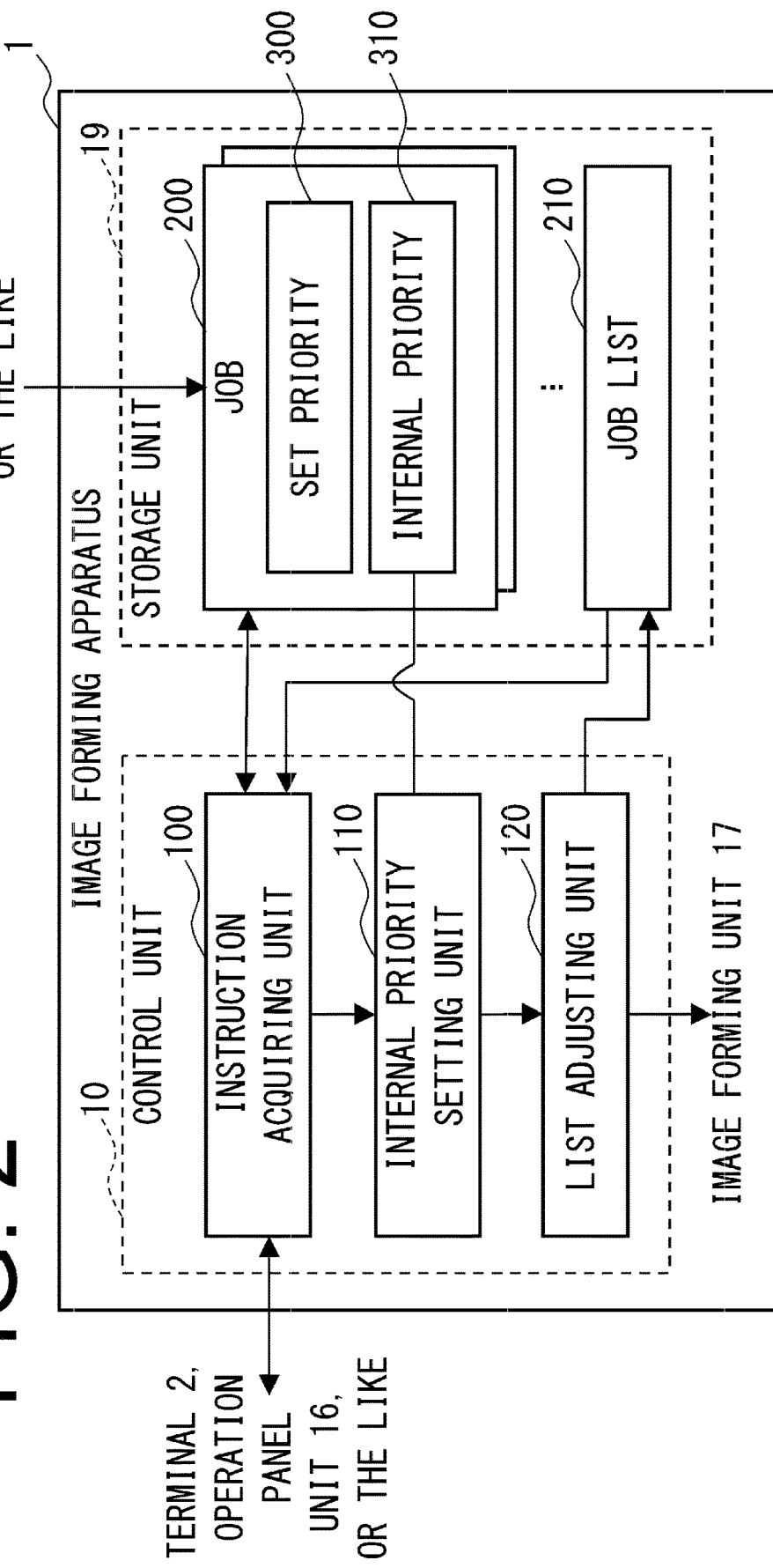
FIG. 2 is a block diagram showing a functional configuration of the image forming apparatus according to the embodiment of the present disclosure.
Figure 3:
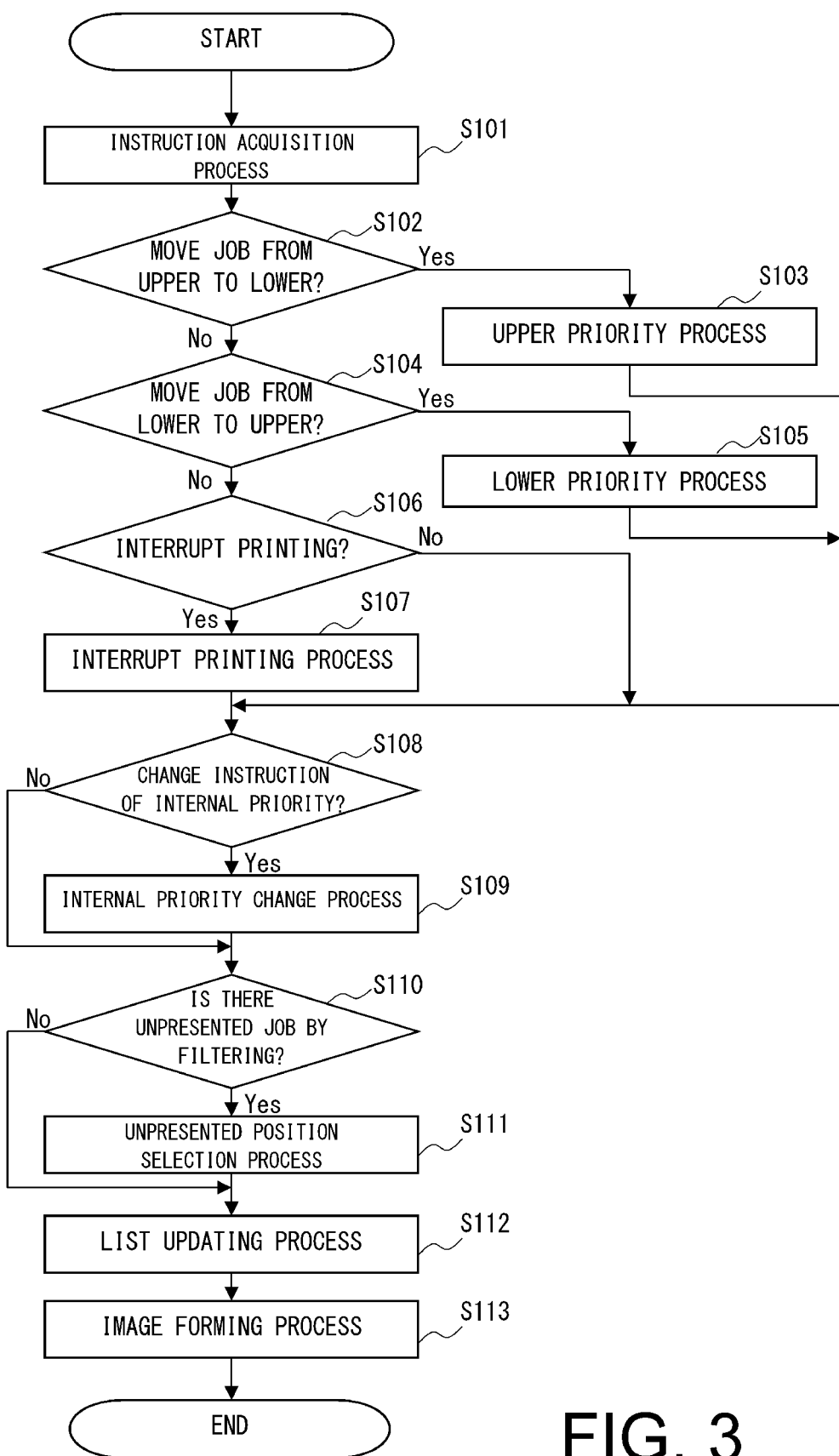
FIG. 3 is a flowchart of priority changing output process according to the embodiment of the present disclosure.

In the present embodiment, the network transmitting and receiving unit 15 is connected via the network 5 to the external terminal 2 in which the user creates and transmits a job 200 (FIG. 2).

In addition, the network transmitting and receiving unit 15 transmits and receives data through the data communication line, and it transmits and receives voice signals through the voice telephone line.

The operation panel unit 16 includes an input unit and a display unit, and it acquires user instructions. The operation panel unit 16 is arranged on the front side of the image forming apparatus 1.

The input unit of the operation panel unit 16 includes buttons, a touch panel, and the like. Among them, the buttons include a numeric pad, direction buttons, a start button, a cancel button, an operation mode switching button, a button for instructing the job 200 (FIG. 2), and the like. The type of operation mode may include copying, facsimile transmission, scanner, network scanner, and the like.

In the present embodiment, the input unit of the operation panel unit 16 acquires an instruction of the job 200 (FIG. 2) by the user. The instruction of this job 200 may be to print, send, save, record, or change an output priority of the selected document. Further, in the present embodiment, it is possible to issue an instruction to move the job 200 (FIG. 2) by using a GUI (Graphical User Interface) on the operation panel unit 16. In addition, the information of each user can be input and changed according to the user instruction obtained from the operation panel unit 16.

The display unit of the operation panel unit 16 is an LCD (Liquid Crystal Display), an organic EL or an organic LED (Organic Light Emitting Diode) display, or the like. In the present embodiment, the display unit displays a job list 210 (FIG. 2). At this time, the output priority of the job 200 (set priority 300 and internal priority 310) can be displayed on the display unit. The details of these features are described later.

The image forming unit 17 causes image formation on a recording paper from the job 200 (FIG. 2) according to the user instruction.

The image forming unit 17 includes a photosensitive drum, an exposure unit, a developing unit, a transfer unit, a fixing unit, and the like, in the case of the electro-dry photographic type. In this case, the image forming unit 17 records a toner image on a recording paper by executing an image forming process including charging, exposure, development, transfer, and fixing. Alternatively, in the case of an inkjet type, the image forming unit 17 can eject ink from an ink tank to form an image on a recording paper.

This can allow the image forming unit 17 to output the job 200 (FIG. 2).

The FAX transmitting and receiving unit 18 performs facsimile transmitting and receiving. The FAX transmitting and receiving unit 18 can receive a facsimile from another FAX apparatus via a voice line, store the image data as a job 200 (FIG. 2) in the storage unit 19, and form an image by the image forming unit 17. Further, the FAX transmitting and receiving unit 18 can convert a document read by the document reading unit 12 or network FAX data transmitted from the external terminal into image data and facsimile-transmit it to another FAX apparatus via the voice line.

The storage unit 19 is a non-transitory recording medium including a semiconductor memory such as ROM (Read Only Memory), RAM (Random Access Memory), and the like, or the other type of memory such as HDD (Hard Disk Drive), and the like.

The control program for controlling the operation of the image forming apparatus 1 is stored in the ROM or HDD of the storage unit 19. In addition, the storage unit 19 also stores user account settings. The storage unit 19 may also include a document box (storage folder) area for each user.

In addition, in the image forming apparatus 1, the control unit 10 and the image processing unit 11 may be integrally formed a like a CPU having a built-in GPU, a chip-on-module package, a SOC (System On a Chip), or the like.

Also, the control unit 10 and the image processing unit 11 may incorporate RAM, ROM, flash memory, or the like.

[Functional Configuration of Image Forming Apparatus 1]

Here, with reference to FIG. 2, the functional configuration of the image forming apparatus 1 is described.

The control unit 10 of the image forming apparatus 1 includes an instruction acquiring unit 100, an internal priority setting unit 110 and a list adjusting unit 120.

The storage unit 19 stores job(s) 200 and a job list 210.

The instruction acquiring unit 100 presents the job list 210 in which a plurality of jobs 200 are arranged in printing order, and it acquires an instruction to change the printing order. At this time, in the present embodiment, the job list 210 is presented as a GUI on the display unit of the operation panel unit 16, and an instruction to change the printing order is acquired based on the input data by the user with the input unit.

In such case, in the present embodiment, the internal priority 310, which is described later, may or may not be displayed. More specifically, the instruction acquiring unit 100 may also present the internal priority 310 to the job list 210 in the change instruction and acquire a change instruction to change the internal priority 310.

In addition, the instruction acquiring unit 100 may perform filtering the plurality of jobs 200 with a specific condition and select the jobs 200 to be presented. For this specific condition, for example, the job 200 of the logged-in user, the job 200 of the group to which the user belongs, or the like, may be set. Furthermore, as the specific condition, it may be possible to perform filtering according to the type of job 200 or the content of the document to be output.

As a result, the instruction acquiring unit 100 can present the job list 210 in which the jobs 200 to be presented are arranged in printing order and acquire an instruction to change the printing order.

The internal priority setting unit 110 sets the internal priority 310, which is different from the set priority 300 designated for each job 200 of the plurality of jobs 200, based on the change instruction acquired by the instruction acquiring unit 100. In the present embodiment, when the job 200 is moved in the job list 210, the internal priority setting unit 110 can set the internal priority 310 of this moving job 200 to be equal to or higher than the set priority 300 of the job 200 at position before movement in the job list 210.

At this time, when the position of the job 200 is moved upward direction in the job list 210 so that the job 200 is to be printed earlier, the internal priority setting unit 110 may set the internal priority 310 of this moving job 200 to be equal to or higher than the set priority 300 of the job 200 at position before upward movement in the job list 210. Alternatively, when the position of the job 200 is moved downward in the job list 210 so that the job 200 is to be printed later, the internal priority setting unit 110 may set the internal priority 310 of this moving job 200 to be equal to or higher than the set priority 300 of the job 200 at position before downward movement in the job list 210.

In addition, in the case of interrupt printing in which the printing job 200 is stopped and printing on interrupt is performed, the internal priority setting unit 110 may set the internal priority 310 of the interrupted job 200 being printed higher than that of other jobs 200. In such case, the internal priority 310 may be set to equal to or higher than a maximum value that can be set by the user to ensure to be printed on the next.

Further, the internal priority setting unit 110 may move the jobs 200 instructed by the change instruction in the job list 210, excluding jobs 200 that are not presented (unpresented) due to filtering.

The internal priority setting unit 110 can also change the internal priority 310 according to a change instruction to change the internal priority 310.

Furthermore, when moving the job 200 instructed by the change instruction and there is an unpresented job 200 in the job list 210, the internal priority setting unit 110 presents the existence of the unpresented job 200. On this basis, the internal priority setting unit 110 may acquire a move instruction so as to whether or not to skip and move the unpresented job 200. The internal priority setting unit 110 may set the internal priority 310 according to the move instruction, and the printing order is adjusted as a result.

At this time, the internal priority setting unit 110 can temporarily present the unpresented job 200 when the move instruction is acquired.

The list adjusting unit 120 adjusts the printing order of the added job 200 according to the internal priority 310 set by the internal priority setting unit 110 and reflects it in the job list 210.

In the present embodiment, the image forming unit 17 outputs each of the plurality of jobs 200 in order of priority according to the internal priority 310 set by the internal priority setting unit 110. At this time, the image forming unit 17 may output each of the plurality of jobs 200 in printing order based on the job list 210 adjusted by the list adjusting unit 120.

The job 200 is document data stored in a document box (storage folder) of the storage unit 19, read by the document reading unit 12, facsimile-received by the FAX transmitting and receiving unit 18, or acquired from the external terminal 2. The document data may be page language data, image data such as TIFF or the like, data of various application software (hereinafter, simply referred to as "application"), and the like.

In the present embodiment, the job 200 also includes information that is a job name such as a job ID, name, and the like, and a status indicating whether the job is on standby or being output (executed). This status information may include status information indicating interrupt printing.

Additionally, in the present embodiment, job 200 includes set priority 300 and internal priority 310.

The set priority 300 is the output priority value instructed for the job 200. This instruction may be designated and set by the user via the operation panel unit 16 when the job 200 is generated and after generation. The set priority 300 is retained even when the same job 200 is output again due to reprinting, or the like.

The internal priority 310 is a priority value different from the set priority 300. The internal priority 310 is set to the same value as the set priority 300 as in the initial value and may be changed or adjusted according to the user instruction to move the job 200 in the job list 210. The internal priority 310 may be returned to the set priority 300 as the default value at the time of reprinting, or the like.

In addition, the set priority 300 and the internal priority 310 may be set as metadata of the job 200 or the like.

The job list 210 is list-format data in which the plurality of jobs 200 are arranged in order of printing.

In the present embodiment, the job list 210 may be displayed in a tabular format on the display unit of the operation panel unit 16 and presented to the user. At the time of this presentation, the job list 210 is arranged for each job 200 so that the direction to print earlier is the upward direction and the direction to be printed later is the downward direction, or the like. Further, the job list 210 may present printing order, status, job names, setting priority 300, and the like. Furthermore, the internal priority 310 may not be displayed when it is the same as the set priority 300, and it may be displayed when the job 200 is moved. Further, in the job list 210, when there is a job 200 that is not presented by filtering (the unpresented job), this job 200 may not need to be displayed.

Here, the control unit 10 of the image forming apparatus 1 functions as the instruction acquiring unit 100, the internal priority setting unit 110 and the list adjusting unit 120 by executing the control program stored in the storage unit 19. Accordingly, the image forming apparatus 1 according to the present embodiment can change the order of printing order the plurality of jobs 200.

Further, each unit of the image forming apparatus 1 as described above serves as a hardware resource for executing the image forming method according to the present disclosure.

A part or any combination of the functional configurations described above may be configured in terms of hardware or circuits by using an IC, programmable logic, FPGA (Field-Programmable Gate Array), or the like.

[Priority Changing Output Process by Image Forming Apparatus 1]

Next, with reference to FIGS. 4 to 15, a priority changing output process by the image forming apparatus 1 according to the embodiment of the present disclosure is described.

In the priority changing output process of the present embodiment, the control unit 10 mainly executes a program stored in the storage unit 19 in cooperation with each unit and using hardware resources.

With reference to the flowchart of FIG. 4, the details of the priority changing output process are described step by step below.

(Step S101)

Firstly, the instruction acquiring unit 100 performs instruction acquisition process.

The instruction acquiring unit 100 waits until an instruction is acquired. At this time, the instruction acquiring unit 100 monitors the storage unit 19 and grasps the addition of the job 200. In addition, the instruction acquiring unit 100 also acquires the status of the job 200 executed in the other thread, or the like. Specifically, the instruction acquiring unit 100 acquires the status of each job 200, such as waiting, outputting (printing), and output completion. Based on this, the instruction acquiring unit 100 generates a job list 210 in which the plurality of jobs 200 are arranged in printing order according to the internal priority 310 of each job 200, and it updates the job list 210 in real time.

In such state, the user logs in to the image forming apparatus 1 and instructs to display the job list 210 from the input unit of the operation panel unit 16. The instruction acquiring unit 100 that has acquired this instruction presents it to the user by displaying the job list 210 on the display unit. At this time, the instruction acquiring unit 100 may select jobs 200 to be presented by filtering under the specific condition in the job list 210 and display only the selected jobs 200 in the job list 210.

Then, the instruction acquiring unit 100 acquires a change instruction of the printing order by the GUI. Specifically, the user selects one or more jobs 200 from the plurality of jobs 200 in the job list 210 by using buttons, a touch panel, or the like, in the input unit. In the present embodiment, the user issues a move instruction to move the selected job 200 by using the numeric keypad, direction buttons, dragging, or the like, as the change instruction to change the printing order by moving the job 200. The instruction acquiring unit 100 acquires this move instruction. This makes it possible to directly change the order in which the jobs 200 are printed.

Furthermore, in the present embodiment, the instruction acquiring unit 100 can also acquire an instruction for interrupt printing. In this case, interrupt printing may be set for the added job 200 itself, or interrupt printing may be set on the job list 210 by using a button, or the like.

Furthermore, in the present embodiment, the instruction acquiring unit 100 can also acquire a change instruction to change the internal priority 310 when the internal priority 310 is also presented in the job list 210.

In this case, the instruction acquiring unit 100 causes the display unit of the operation panel unit 16 to display the job list 210. Then, when the area of the numerical value of the internal priority 310 is selected on the GUI, the instruction acquiring unit 100 allows the user to edit the value of the internal priority 310. Specifically, the instruction acquiring unit 100 may cause the user to input the value by using the numeric keypad or increase or decrease the value by using the direction buttons, and it may acquire this as the change instruction for changing the internal priority 310.

In addition, in the present embodiment, when there is an unpresented job 200, the instruction acquiring unit 100 can present the existence of the unpresented job 200 and also acquire the move instruction as to whether or not to skip and move it.

With reference to FIGS. 4 and 5, a specific example of the job list 210 is described.

FIG. 4 shows an example of job list 210-1 as it is generated. Here, the printing order is such that the "Mid 1" job 200 is being printed, followed by the "Mid 2" job 200, and then the "Mid 3" job 200 is to be printed. Also, the set priority 300 of all the job 200 is "50".

The job list 210-2 in FIG. 5 shows an example when a "High 1" job 200 with the set priority 300 of "70" is added to the job list 210-1 in FIG. 4. In this case, the set priority 300 of the added "High 1" job 200 is "70", which is higher than the others. Therefore, the "High 1" job 200 is printed next to the "Mid 1" job 200 being printed, that is, secondly in order.

However, in the present embodiment, in this state, the user may issue a change instruction of the printing order as described follows.

(Step S102)

Then, the instruction acquiring unit 100 determines whether or not the job 200 has been moved from upper to lower. The instruction acquiring unit 100 determines Yes if the user issues the move instruction to move the job 200 from upper to lower in the acquired change instruction of the printing order. In other cases, the instruction acquiring unit 100 determines No.

In the case of Yes, the instruction acquiring unit 100 advances the process to step S103.

In the case of No, the instruction acquiring unit 100 advances the process to step S104.

(Step S103)

When the job 200 is moved from upper to lower, the internal priority setting unit 110 performs upper priority process.

Firstly, the internal priority setting unit 110 sets the internal priority 310 different from the set priority 300 specified for each job 200 of the plurality of jobs 200 based on the change instruction acquired by the instruction acquiring unit 100.

In this process, the internal priority setting unit 110 sets the internal priority 310 of this moving moving job 200 to be equal to or higher than the set priority 300 of the job 200 that has been existed at position before upward movement in the job list 210.

With reference to FIGS. 6 to 8, a specific example of the upper priority process is described.

The job list 210-3 in FIG. 6 shows an example in which the user has issued a move instruction to directly move the "Mid 2" job 200 to the second position in the job list 210-2 in FIG. 5. Here, FIG. 6 shows the result of this job 200 has been moved. That means, the job list 210-3 shows a state that the position of the "Mid 2" job 200 is raised above the "High 1" job 200.

According to FIG. 7, because the "Mid 2" job 200 is moved from the lower position of the "High 1" job 200 to the upper position of it, the internal priority setting unit 110 changes the internal priority 310 of the "Mid 2" job 200 to "70". The job list 210-4 in FIG. 7 also shows internal priority 310 for this state. In this job list 210-4, although the set priority 300 of the "Mid 2" job 200 remains "50", the internal priority 310 is set to "70", which is the same as the "High 1" job 200. As described above, the "High 1" job 200 has been second position in the printing order before moving.

In addition, in the present embodiment, when the set priority 300 and the internal priority 310 are the same, the internal priority 310 may not be displayed. However, when changed in this way, display may be enabled by setting.

The job list 210-5 in FIG. 8 shows an example in which the "High 2" job 200 with the set priority 300 of "70" is added to the job list 210-4 in FIG. 7. Here, only the set priority 300 is shown. In this case, as the printing order, according to comparison of the internal priority 310, the "High 2" job 200 is printed after the "High 1" job 200 as shown in the job list 210-5. This is because the "High 2" job 200 has the same set priority 300 value as "High 1" and should be printed next to "High 1". However, the user has instructed to move the "Mid 2" job 200 to be printed earlier than the "High 1". Therefore, it becomes the "Mid 2" job 200 should be printed before "High 2".

After that, internal priority setting unit 110 advances the process to step S108.

(Step S104)

If the job 200 is not moved from upper to lower, the instruction acquiring unit 100 determines whether the job 200 is moved from lower to upper. The instruction acquiring unit 100 determines Yes if the user issues a move instruction to move the job 200 from lower to upper in the acquired printing order change instruction. In other cases, the instruction acquiring unit 100 determines No. In addition, the instruction acquiring unit 100 also determines No if the user instructs interrupt printing.

In the case of Yes, the instruction acquiring unit 100 advances the process to step S105.

In the case of No, the instruction acquiring unit 100 advances the process to step S106.

(Step S105)

If the job 200 is moved from lower to upper, the internal priority setting unit 110 performs lower priority process.

Also in this process, the internal priority setting unit 110 sets the internal priority 310 different from the set priority 300 designated for each job 200 of the plurality of jobs 200 based on the change instruction acquired by the instruction acquiring unit 100.

Here, the user's move instruction is to move the job 200 from lower to upper. In this case, the internal priority setting unit 110 sets the internal priority 310 of this moving job 200 to be equal to or higher than the set priority 300 of the job 200 at position before downward movement in the job list 210.

With reference to FIGS. 9 to 11, a specific example of the lower priority processing is described.

The job list 210-6 in FIG. 9 shows an example of the result of lowering the position of the "High 1" job 200 below "Mid 2" from the state of the job list 210-2 in FIG. 5. Here, the printing order of the job list 210-6 is the same as that of the job list 210-3 in FIG. 6. That is, even if the "High 1" job 200 is moved below the "Mid 2" job 200 from the job list 210-2, the set priority 300 is the same as that of the job list 210-3.

In the job list 210-6 in FIG. 10, however, since the "High 1" job 200 has been moved from the upper to the lower of the "Mid 2" job 200, the internal priority setting unit 110 changes the internal priority 310 of "High 1" to "50". The internal priority 310 in this state is also as shown in job list 210-7 of FIG. 10. In the job list 210-7, the internal priority 310 of the "High 1" job 200 is set to "50", which is the same as the "Mid 2" job 200 that has been third in the printing order before moving.

The job list 210-8 in FIG. 11 shows the printing order when the "High 2" job 200 with the set priority 300 of "70" is added to the state of the job list 210-7 in FIG. 10 Here, the "High 1" job 200 has been moved below the "Mid 2" job 200 and therefore has a lower printing priority than the "Mid 2" job 200. Since the job 200 of "Mid 2" has not been moved, its printing priority is lower than that of the job 200 of "High 2" whose set priority 300 is "70". Therefore, the job 200 of "High 2" should be printed before the "Mid 2" job 200.

After that, internal priority setting unit 110 advances the process to step S108.

In this way, in the upper priority process and the lower priority process as described above, if the printing order of the job 200 is changed in the job list 210, the internal priority 310 is updated according to whether it is moved upward or downward.

As a result, although the job list 210-3 in FIG. 6 and the job list 210-6 in FIG. 9 have the same printing order, the added job 200 has a different printing order. That is, in the case of the job list 210-3, the added "High 2" job 200 is printed in the printing order based on the job list 210-5. On the other hand, in the case of the job list 210-6, the added "High 2" job 200 is printed in the printing order based on the job list 210-8.

(Step S106)

If the job 200 is not moved from lower to upper, the instruction acquiring unit 100 determines whether it is interrupt printing or not. The instruction acquiring unit 100 determines Yes if the user instructs interrupt printing. In other cases, the instruction acquiring unit 100 determines No.

In the case of Yes, the instruction acquiring unit 100 advances the process to step S107.

In the case of No, the instruction acquiring unit 100 advances the process to step S108.

(Step S107)

In the case of interrupt printing, the internal priority setting unit 110 performs interrupt printing process.

In the case of interrupt printing, the internal priority setting unit 110 sets the internal priority 310 of the interrupted job 200 being printed higher than the other jobs 200.

With reference to FIG. 12, a specific example of the interrupt printing process is described. The job list 210-9 of FIG. 12 is an example in which the job 200 of "Mid 3" is placed at the top and printed by interruption after stopping the "Mid 1" job 200 in the printing state in the job list 210-2 of FIG. 5.

At this time, the internal priority setting unit 110 can set, for example, the internal priority 310 of the "Mid 1" job 200 to the maximum value. The maximum value may be, for example, the maximum value of the set priority 300 that can be set by the user, or more. In the example of FIG. 12, "255" is set as the maximum value. In this way, the internal priority setting unit 110 can ensure that the "Mid 1" job 200 being interrupted is printed after the output of the interrupting "Mid 3" job 200 is completed.

(Step S108)

Here, the instruction acquiring unit 100 determines whether the change instruction of the internal priority is acquired or not. The instruction acquiring unit 100 determines Yes if the instruction to change the internal priority 310 is acquired. In other cases, the instruction acquiring unit 100 determines No.

In the case of Yes, the instruction acquiring unit 100 advances the process to step S109.

In the case of No, the instruction acquiring unit 100 advances the process to step S110.

(Step S109)

In the case that the change instruction of the internal priority is acquired, the internal priority setting unit 110 performs internal priority change process.

The internal priority setting unit 110 changes the internal priority 310 according to the change instruction to change the internal priority 310.

Accordingly, when the job list 210 is updated, the printing order of the jobs 200 can be automatically changed according to the changed internal priority 310.

(Step S110)

Here, the internal priority setting unit 110 determines whether there is an unpresented job 200 by filtering or not. In the case of moving the job 200 instructed by the change instruction in the job list 210, if there is an unpresented job 200 between the jobs 200 to be moved, the internal priority setting unit 110 determines Yes. Otherwise, internal priority setting unit 110 determines No.

In the case of Yes, the internal priority setting unit 110 advances the process to step S111.

In the case of No, internal priority setting unit 110 advances the process to step S112.

(Step S111)

In the case that there is an unpresented job 200, the internal priority setting unit 110 performs unpresented position selection process.

The internal priority setting unit 110 moves the jobs 200 instructed by the change instruction in the job list 210 by skipping the unpresented job 200 by filtering.

With reference to FIGS. 13 to 15, a specific example of the unpresented position selection process is described.

As described above, in the present embodiment, the job list 210 can filter the display. In the present embodiment, as the specific filtering condition, for example, it is possible to select the job 200 to be presented according to the group to which the logged-in user belongs.

FIG. 13 shows an example of a job list 210-10 in which jobs 200 belonging to "Group1" and "Group 2" are mixed. In the example of the job list 210-10, filtering is performed with "Group 1" to which the user belongs as the specific condition, and jobs 200 belonging to "Group 2" are not presented. That is, in the example of FIG. 13, as the jobs of "Group 2" are shown in gray, but actually they do not have to be displayed on the display unit of the operation panel unit 16 as they are.

The job list 210-11 in FIG. 14 is an example in which the job 200 of "Group1-Hight1" is moved under the "Group1-Hight2" job 200 in the job list 210-10 in FIG. 13. In this case, the job 200 move from upper to lower, and the "Group1-Hight1" job 200 becomes lower to the "Group1-Hight2" job 200. That is, "Group1-Hight2" is arranged above "Group2-Hight1".

The job list 210-12 in FIG. 15 is an example in which the "Group1-Mid2" job 200 is moved above "Group1-Mid1" in the job list 210-10 in FIG. 13. In this case, the job 200 below the arranged position is used as a reference, and the "Group1-Mid2" job 200 becomes above the "Group1-Mid1" job 200. That is, the "Group2-Mid2" job 200 is arranged under "Group2-Mid1".

In this way, the job 200 can be placed in the proper position even if the job 200 is filtered.

Here, in the present embodiment, by setting, the internal priority setting unit 110 can present the existence of the unpresented job 200 and acquire a move instruction so as to whether or not to skip and move the unpresented job 200. Then, the internal priority setting unit 110 sets the internal priority 310 according to the move instruction, and it results adjusting the printing order.

Specifically, in a case of moving a job 200, if there is a job 200 that has not been presented by filtering, it is possible to allow the user to select the position where the moving job 200 is to be inserted.

As regarding the move instruction for the unpresented job 200, an example in which the "Group1-Mid2" job 200 is inserted between "Group1-Hight2" and "Group1-Mid1" from the state of the job list 210-10 in FIG. 13 is described.

Specifically, the internal priority setting unit 110 can allow the user to select whether to (case i) move the "Group1-Mid2" job 200 above the "Group1-Mid1" job 200, or (case ii) move the "Group1-Mid2" job 200 under the "Group1-Hight2" job 200.

In (case i), the internal priority setting unit 110 can set the internal priority 310 to "50" based on the "Group1-Mid1" job 200 below. On the other hand, in (case ii), the internal priority setting unit 110 can set the internal priority 310 to "70" based on the "Group1-Hight2" job 200

As a result, it is possible to print in the printing order intended by the user.

Alternatively, the internal priority setting unit 110 can temporarily present the unpresented job 200 and allow the user to select which side of the unpresented job 200 to move upward or downward.

Again, the reference is made to the example of the job list 210-10 in FIG. 13 and is described. The job 200 belonging to "Group2" is not presented, and if the "Group1-Mid2" job 200 is moved upward, since this job 200 is moved from the lower position, it is possible to move with the lower job 200 as a reference.

At this time, the "Group1-Mid2" job 200 is moved between "Group1-Hight2" and "Group1-Mid1".

Here, the internal priority setting unit 110 can temporarily display, for example, the "Group2-Hight1" and "Group2-Mid1" jobs 200, which has not been displayed, by using a pop-up window, or the like. This makes it possible to select where to put in the actual order on the GUI.

For example, the user may be allowed to select the "Group1-Mid2" job 200 to be placed above "Group2-Mid1" or "Group2-Hight1". Furthermore, it may be possible to select to be between "Group2-Hight1" and "Group2-Mid1".

By performing in this way, for example, if there are many jobs 200 of "Group2" between "Group1-Hight2" and "Group1-Mid1" and the printing order is delayed, it can call attention. Therefore, it is possible for the user to select which direction to move.

(Step S112)

Here, the list adjusting unit 120 performs list updating process.

The list adjusting unit 120 adjusts the printing order of the added job 200 according to the internal priority 310 set by the internal priority setting unit 110, and it reflects the printing order on the job list 210 stored in the storage unit 19.

In addition, in each of the above examples, the job list 210 after reflection can be displayed on the display unit of the operation panel unit 16.

(Step S113)

Then, the image forming unit 17 performs image forming process.

The image forming unit 17 forms images of the plurality of jobs 200 stored in the storage unit 19 according to the internal priority 310. At this time, the image data of the job 200, which has undergone color conversion and raster image processor (RIP) processing by the control unit 10 and the image processing unit 11 and has been converted into binary band data, can be printed page by page.

With the above, the priority changing output process according to the embodiment of the present disclosure completes.

As configured in this way, the following effects can be obtained.

In a typical image forming apparatus, the priority (set priority) of each job may be set in order to control the order of printing. In this case, the image forming apparatus controls the printing order according to the priority of the jobs set by the user. Then, while the priority order change screen is being displayed, it is prohibited to execute a new job, and after the display is finished, the waiting job is executed according to the order of priority.

However, in the typical image forming apparatus as like this, there is no disclosure regarding the processing when changing the order. In other words, with respect to the order of printing, the printing is simply performed in the order of priority set by the user.

For this reason, when a job is added after that, it may not be possible to print them in the proper order intended by the user. In other words, the printing order of the other added job cannot be properly set or adjusted.

On the other hand, the image forming apparatus 1 according to the embodiment of the present disclosure is an image forming apparatus according to the present disclosure is an image forming apparatus capable of changing printing order a plurality of jobs 200, including: an instruction acquiring unit 100 that presents a job list 210 in which the plurality of jobs 200 is arranged in the printing order and acquires a change instruction of the printing order; an internal priority setting unit 110 that sets, based on the change instruction acquired by the instruction acquiring unit 100, an internal priority 310 that is different from set priority 300 specified for each of the plurality of jobs 200; a list adjusting unit 120 that adjusts the printing order of an adding job 200 according to the internal priority 310 set by the internal priority setting unit 110 and reflect the adjustment in the job list 210; and an image forming unit 17 that outputs the plurality of jobs 200 in the printing order based on the job list 210 adjusted by the list adjusting unit 120.

With this configuration, when the print order of the job 200 is controlled according to the priority and the print order is changed by user operation, the print order can be properly controlled. That is, the printing order of the other added job 200 can be set and adjusted, appropriately.

In addition, by adjusting the internal priority 310 instead of the set priority 300, the set priority 300 can be used when the job 200 is reused by reprinting, or the like, after the output of the job 200 is completed. As a result, the printing can be performed in the appropriate printing order in the case of reusing.

Further, in the image forming apparatus 1 according to the embodiment of the present disclosure, the internal priority setting unit 100 sets, when moving the job 200 in the job list 210, the internal priority 310 of this moving job 200 to equal to or higher than the set priority 300 of a job 200 at position before movement in the job list 210.

With this configuration, it is possible to appropriately set the printing order of the other added job 200 according to the movement of the job 200.

Further, in the image forming apparatus 1 according to the embodiment of the present disclosure, the internal priority setting unit 110 sets, when moving the position of the job 200 to upward direction in the job list 210 so that the job is to be printed earlier, the internal priority 310 of this moving job 200 to be equal to or higher than the set priority 300 of a job 200 at a position before moving to the upward direction in the job list 210 and sets, when moving the position of the job 200 to downward direction in the job list 210 so that the job is to be printed later, the internal priority 310 of this moving job 200 to be equal to or higher than the set priority 300 of a job 200 at a position before moving to the downward direction in the job list 210.

With this configuration, the internal priority 310 can be changed according to the direction in which the job 200 is moved. Specifically, when the job 200 is moved from lower to upper (upward, and the direction to print earlier), the internal priority 310 is set to the priority of the lower job 200. Otherwise, when the job 200 is moved from upper to lower (downward, and the direction to print later), the internal priority 310 is set to the upper job 200. Thus, the other added job 200 can be printed in a printing order more in line with the user's intention.

Further, in the image forming apparatus 1 according to the embodiment of the present disclosure, the internal priority setting unit 110 sets, in a case of interrupt printing, which the job 200 being printed is stopped and printing is performed by interruption, the internal priority 310 of the interrupted job 200 being printed is higher than the other jobs 200.

With this configuration, after interrupt printing, the job 200 that has been in the printing state can be reliably printed. Therefore, user convenience can be enhanced.

Further, in the image forming apparatus 1 according to the embodiment of the present disclosure, the instruction acquiring unit 100 select jobs 200 to be presented by filtering with a specific condition in the job list 210; and the internal priority setting unit 110 moves the job 200 instructed by the change instruction in the job list 210 by skipping an unpresented job 200 by the filtering.

With this configuration, the printing order can be appropriately controlled even when filtering is used. As a result, printing can be performed in an appropriate printing order in case of reusing.

Further, the image forming apparatus 1 according to the embodiment of the present disclosure is an image forming apparatus capable of changing printing order of a plurality of jobs 200, including: an instruction acquiring unit 100 that present a job list 210 in which the plurality of jobs 200 is arranged in the printing order and acquire a change instruction of the printing order; an internal priority setting unit 110 that sets, based on the change instruction acquired by the instruction acquiring unit 100, an internal priority 310 that is different from set priority 300 specified for each of the plurality of jobs 200; and an image forming unit 17 that outputs each of the plurality of jobs 200 in the printing order corresponding to the internal priority 310 set by the internal priority setting unit 110; wherein: the instruction acquiring unit 100 also presents the internal priority 310 to the job list 210 and acquires a change instruction to change the internal priority 310; and the internal priority setting unit 110 changes the internal priority 310 according to the change instruction to change the internal priority 310.

By configuring in this way, when the internal priority 310 is changed according to the movement of the job 200, the user can make appropriate adjustments. Also, instead of changing the setting priority 300, by changing the internal priority 310 while keeping the setting priority 300 as it is, the print order in the job list 210 can be changed, temporarily. Therefore, an appropriate printing order can be set, and even when reusing such as reprinting, the printing can be performed in an appropriate printing order with the set priority of 300.

Further, the image forming apparatus 1 according to the embodiment of the present disclosure is an image forming apparatus capable of changing printing order of a plurality of jobs 200, including: an instruction acquiring unit 100 that performs filtering the plurality of jobs 200 under a specific condition, presents a job list 210 in which presented jobs 200 are selected and arranged in the printing order, and acquires a change instruction of the printing order; an internal priority setting unit 110 that sets, based on the change instruction acquired by the instruction acquiring unit 100, an internal priority 310 that is different from set priority 300 specified for each of the plurality of jobs 200; a list adjusting unit 120 that adjusts the printing order of an adding job 200 according to the internal priority 310 set by the internal priority setting unit 110 and reflects the adjustment in the job list 210; and an image forming unit 17 that outputs each of the plurality of jobs 200 in the printing order based on the job list 210 adjusted by the list adjusting unit 120; wherein the internal priority setting unit 110, in a case of moving the job 200 instructed by the change instruction in the job list 210, when there is an unpresented job 200 by the filtering, presents the existence of this unpresented job 200, and sets the internal priority 310 according to a move instruction so as to whether or not to skip and move the unpresented job 200.

By configuring like this, a situation that there are more unpresented jobs 200 than expected by the user and the user feel inconvenient because it takes a long time to get his or her turn can be avoided.

Further, in the image forming apparatus 1 according to the embodiment of the present disclosure, the internal priority setting unit 110 temporarily presents the unpresented job 200 when the move instruction is acquired.

By configuring in this way, it is possible to present an unpresented job 200 by a pop-up window, or the like. As a result, the movement of the job 200 while presenting the filtered job list 210 as it is can be instructed. Therefore, user convenience can be enhanced.

[Other Embodiments]

In addition, in the embodiment according to the present disclosure, an example of setting the printing order of the job 200 in the image forming apparatus 1 has been described. However, as like so-called "pull printing," the image forming system may be configured such that outputting order of the jobs 200 stored in the server (information processing apparatus) is changed in the server.

Figure 16:
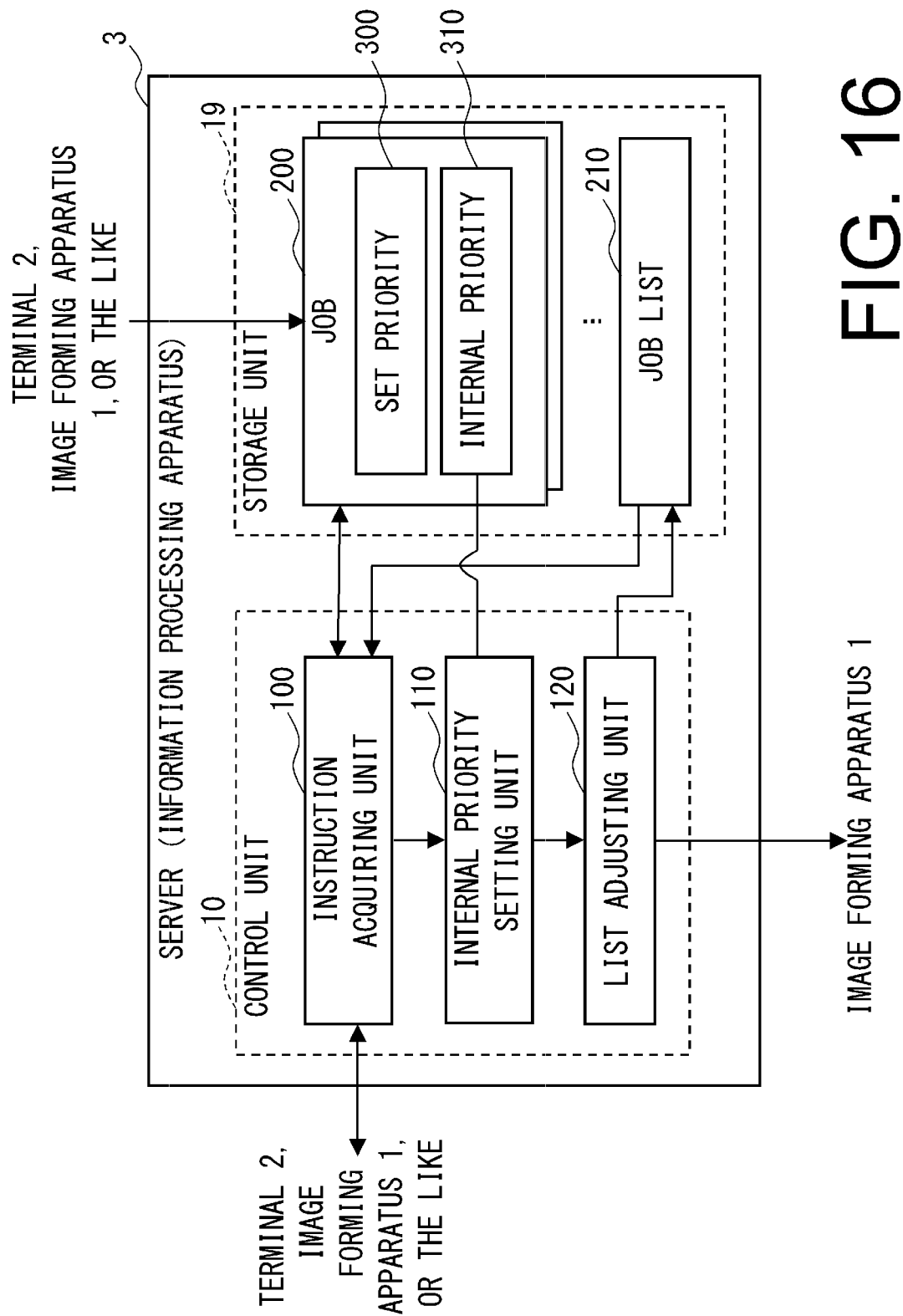
FIG. 16 is a block diagram showing the functional configuration of the server of the image forming system according to another embodiment according to the present disclosure.

FIG. 16 shows a functional configuration of a server 3, which is an example of the information processing apparatus of the image forming system configured as described above.

On this server 3, processing similar to that of the image forming apparatus 1 as described above may be performed, and each job 200 may be transmitted to the image forming apparatus 1 by network or direct connection. In this system, the image forming unit 17 may exist on the image forming apparatus 1.

As configured in this way, it is possible to appropriately set and adjust the printing order of the jobs 200 even in pull printing, or the like.

Further, in the above-described embodiment, the internal priority 310 is set for the job 200.

However, the internal priority 310 may be set in the job list 210. Alternatively, a database that collects the internal priorities 310 of the job 200, or the like, can be prepared.

By configuring in this way, the internal priority 310 can be set without changing the data of the job 200, and a flexible system configuration can be accommodated.

Further, in the above-described embodiment, an example of printing output by the image forming unit 17 as the output of the job 200 has been described.

However, the job 200 can also be applied to types other than the print job, and output by other types of image formation is also possible. For example, a job 200 for image data acquisition by network scanning, generation of electronic documents such as PDF, or the like, document processing such as OCR (optical character recognition), or the like, can be output after performing rearrangement processing similar to the above-described priority changing output process.

With such a configuration, it is possible to provide an image forming apparatus capable of appropriately setting and adjusting the output order of the other added job 200 for various jobs 200.

The present disclosure can also be applied to information processing apparatuses other than image forming apparatuses and servers. In other words, a network scanner, a server to which the scanner is separately connected via a USB, or the like, may be used.

Also, as used herein, the singular forms "a," "an," and "the" include plural forms unless the context clearly dictates otherwise.

Further, the configuration and operation of the above-described embodiment are examples, and needless to say, they can be modified and executed as appropriate without departing from the aim according to the present disclosure.

What is claimed is:

1. An image forming apparatus capable of changing printing order of a plurality of jobs, comprising:

an instruction acquiring unit configured to present a job list in which the plurality of jobs is arranged in the printing order and acquire a change instruction of the printing order;

an internal priority setting unit configured to set, based on the change instruction acquired by the instruction acquiring unit, an internal priority that is different from set priority that is designated and set by a user at the time of generation and after generation for each of the plurality of jobs; and an image forming unit that outputs each of the plurality of jobs in the printing order corresponding to the internal priority set by the internal priority setting unit; wherein:

the instruction acquiring unit also presents the internal priority to the job list and acquires a change instruction to change the internal priority; and the internal priority setting unit changes the internal priority different from the set priority according to the change instruction to change the internal priority.

2. The image forming apparatus according to claim 1, wherein:

the internal priority setting unit sets, when moving the position of the job to upward direction in the job list so that the job is to be printed earlier, the internal priority of the moving job to be equal to or higher than the set priority of a job at a position before moving to the upward direction in the job list and sets, without the image forming apparatus changing the set priority; and when moving the position of the job to downward direction in the job list so that the job is to be printed later, the internal priority of the moving job to be equal to or higher than the set priority of a job at a position before moving to the downward direction in the job list, without the image forming apparatus changing the set priority.

3. The image forming apparatus according to claim 1, further comprising:

a list adjusting unit configured to adjust the printing order of an adding job according to the internal priority set by the internal priority setting unit and reflect adjustment in the job list; wherein the image forming apparatus is configured to output the plurality of jobs in a printing order based on the job list adjusted by the list adjusting unit.

4. The image forming apparatus according to claim 1, wherein:

the internal priority setting unit sets, in a case of interrupt printing, which the job being printed is stopped and printing is performed by interruption, the internal priority of the interrupted job being printed is higher than other job.

5. The image forming apparatus according to claim 1, wherein:

the instruction acquiring unit selects jobs to be presented by filtering with a specific condition in the job list;

the internal priority setting unit moves the job instructed by the change instruction in the job list by skipping an unpresented job by the filtering; and in a state in which unpresented jobs are temporarily displayed, the internal priority setting unit puts the job in an order by using the change instruction.

6. The image forming apparatus according to claim 1, wherein the image forming apparatus is configured such that the internal priority is not displayed in case of being same as the set priority but is temporarily displayed in case of moving a job.

7. The image forming apparatus according to claim 6, wherein the image forming apparatus is configured such that the internal priority is displayed and is enabled to be set when changed to a value different from the set priority.

8. The image forming apparatus according to claim 1, wherein the image forming apparatus is configured such that the internal priority of a job is returned to the set priority as a default value when reprinting, and the job is printed in an appropriate printing order.

9. An image forming system capable of changing printing order of a plurality of jobs, comprising:

an instruction acquiring unit configured to present a job list in which the plurality of jobs is arranged in the printing order and acquire a change instruction of the printing order;

an internal priority setting unit configured to set, based on the change instruction acquired by the instruction acquiring unit, an internal priority that is different from set priority that is designated and set by a user at the time of generation and after generation for each of the plurality of jobs; and an image forming unit that outputs each of the plurality of jobs in the printing order corresponding to the internal priority set by the internal priority setting unit; wherein:

the instruction acquiring unit also presents the internal priority to the job list and acquires a change instruction to change the internal priority; and the internal priority setting unit changes the internal priority different from the set priority according to the change instruction to change the internal priority.

10. The image forming system according to claim 9, wherein:

the internal priority setting unit sets, when moving the position of the job to upward direction in the job list so that the job is to be printed earlier, the internal priority of the moving job to be equal to or higher than the set priority of a job at a position before moving to the upward direction in the job list and sets, without an image forming apparatus changing the set priority, and when moving the position of the job to downward direction in the job list so that the job is to be printed later, the internal priority of the moving job to be equal to or higher than the set priority of a job at a position before moving to the downward direction in the job list, without the image forming apparatus changing the set priority.

11. The image forming system according to claim 9, further comprising:

a list adjusting unit configured to adjust the printing order of an adding job according to the internal priority set by the internal priority setting unit and reflect adjustment in the job list; wherein the image forming system is configured to output the plurality of jobs in a printing order based on the job list adjusted by the list adjusting unit.

12. The image forming system according to claim 9, wherein:

the internal priority setting unit sets, in a case of interrupt printing, which the job being printed is stopped and printing is performed by interruption, the internal priority of the interrupted job being printed is higher than other job.

13. The image forming system according to claim 9, wherein:

the instruction acquiring unit selects jobs to be presented by filtering with a specific condition in the job list;

the internal priority setting unit moves the job instructed by the change instruction in the job list by skipping an unpresented job by the filtering; and in a state in which unpresented jobs are temporarily displayed, the internal priority setting unit puts the job in an order by using the change instruction.

14. An image forming method executed by an image forming apparatus capable of changing printing order of a plurality of jobs, comprising the steps of:

presenting a job list in which the plurality of jobs is arranged in the printing order and acquiring a change instruction of the printing order;

presenting an internal priority that is different from set priority that is designated and set by a user at the time of generation and after generation for each of the plurality of jobs to the job list and acquiring a change instruction to change the internal priority;

setting, based on the acquired change instruction, the internal priority;

changing the internal priority different from the set priority according to the change instruction to change the internal priority; and outputting each of the plurality of jobs in the printing order corresponding to the set internal priority.

15. The image forming method according to claim 14, wherein:

setting, when moving the position of the job to upward direction in the job list so that the job is to be printed earlier, the internal priority of the moving job to be equal to or higher than the set priority of a job at a position before moving to the upward direction in the job list and sets, without changing the set priority, and when moving the position of the job to downward direction in the job list so that the job is to be printed later, the internal priority of the moving job to be equal to or higher than the set priority of a job at a position before moving to the downward direction in the job list, without changing the set priority.

16. The image forming method according to claim 14, further comprising:

adjusting the printing order of an adding job according to the set internal priority and reflect adjustment in the job list; and wherein the step of outputting each of the plurality of jobs in the printing order corresponding to the set internal priority comprises outputting the plurality of jobs in a printing order based on the adjusted job list.

17. The image forming method according to claim 14, comprising:

setting, in a case of interrupt printing, which the job being printed is stopped and printing is performed by interruption, the internal priority of the interrupted job being printed is higher than other job.

18. The image forming method according to claim 14, comprising:

selecting jobs to be presented by filtering with a specific condition in the job list;

moving the job instructed by the change instruction in the job list by skipping an unpresented job by the filtering; and in a state in which unpresented jobs are temporarily displayed, allowing a user to change an order of the job.

* * * * *